United States Patent [19]
Furusawa

[11] Patent Number: 5,904,216
[45] Date of Patent: May 18, 1999

[54] REAR SUSPENSION FOR SNOWMOBILE

[75] Inventor: Masao Furusawa, Iwata, Japan

[73] Assignee: Yamaha Hatsudoki Kabushiki Kaisha, Iwata, Japan

[21] Appl. No.: 08/752,686

[22] Filed: Nov. 19, 1996

[30] Foreign Application Priority Data

Nov. 22, 1995 [JP] Japan .................................. 7-304247

[51] Int. Cl.⁶ .................................................. B62M 27/02
[52] U.S. Cl. ........................................... 180/193; 180/9.54
[58] Field of Search .................................... 180/190, 193, 180/186, 9.5, 9.54; 305/127, 128, 130, 131

[56] References Cited

U.S. PATENT DOCUMENTS

| | | |
|---|---|---|
| 3,784,263 | 1/1974 | Hendrickson et al. .................... 305/22 |
| 4,305,476 | 12/1981 | Blass et al. ............................. 180/9.54 |
| 4,314,618 | 2/1982 | Tamura .................................... 180/193 |
| 5,586,614 | 12/1996 | Kouchi et al. .......................... 180/190 |
| 5,727,643 | 3/1998 | Kawano et al. ......................... 180/193 |

*Primary Examiner*—Lanna Mai
*Assistant Examiner*—Faye M. Fleming
*Attorney, Agent, or Firm*—Knobbe, Martens, Olson & Bear LLP

[57] ABSTRACT

A number of embodiments for suspension units for snowmobile drive belts that provide a compact assembly and yet permit the use of a single cushioning unit that can extend horizontally within the frame so as to provide large suspension travel in a relatively small area.

17 Claims, 7 Drawing Sheets

REAR SUSPENSION FOR SNOWMOBILE

BACKGROUND OF THE INVENTION

This invention relates to a snowmobile and more particularly to an improved drive belt suspension system for a snowmobile.

As is well known, most conventional snowmobiles employ a drive belt that is driven by the engine through a transmission for propelling the snowmobile along the body of terrain over which it is traversing. The drive belt conventionally runs over a guide rail or guide rail assembly that backs up the portion of the drive belt that engages the ground. This guide rail assembly is suspended by some form of suspension system for suspension movement relative to the frame. Conventionally, the guide rail is suspended by front and rear suspension units each of which load a respective cushioning arrangement. In order to maintain a compact assembly, the suspension units and cushioning elements are generally positioned within the confine of the belt.

A conventional type of snowmobile drive belt suspension system is depicted in FIG. 1 and will be described by reference to that figure in order to explain the problems attendant with the prior art type of construction.

As seen in FIG. 1, the snowmobile is comprised of a frame assembly that is shown partially in phantom and is identified generally by the reference numeral 11. This frame assembly journals a driving sprocket 12 which is driven from an engine through a transmission which are of any conventional type and which engine and transmission are not illustrated.

The drive sprocket is engaged with a drive belt 13 which is suspended for suspension movement relative to the frame assembly 11 by a suspension system, indicated generally by the reference numeral 14 and comprised of a front unit 15 and a rear unit 16. These suspension units 15 and 16 support a guide rail assembly 17 which is primarily comprised of a pair of spaced apart guide rails and which engage the backside of the portion of the drive belt 13 that engages the ground over which the snowmobile is traveling.

The guide rail assembly 17 journals a plurality of backup rollers 18 and a larger, idler roller 19. In addition, further rollers 20 and are carried by the frame assembly 11 so as to define the path over which the drive belt 13 travels.

The front suspension unit 15 includes a pair of links 21 that are pivotally connected at one end to the guide rail 17, via brackets 22. The other end of the links 21 are connected to lever arms 23 that are fixed to a tube 24 that is pivotally carried by the frame assembly 11 for pivoting the levers 23 upon suspension travel of the front of the guide rail 17. These levers are connected by a pivot pin 25 to one end of a combined hydraulic shock absorber and coil compression spring assembly 26. The other end of this assembly is connected by a further bracket 27 to the guide rail 17 so as to load the opposite ends of the assembly 26 upon suspension travel of the front portion of the guide rail 17.

The rear suspension unit 16 includes a pair of first links 28 that have pivotal connections 29 at one end to the sides of the guide rail assembly 17. A further pivotal connection 31 connects the opposite end of links 28 with respective second links 32. The other ends of the links 32 are fixed to a frame tube 33 that is journalled on the frame 11. A bracket 34 is coupled to this end of the links 32 and cooperates to load a second suspension unit 35.

The second suspension unit 35, like the suspension unit 26, is comprised of a tubular shock absorber and surrounding coil spring. The bracket 34 has a pivotal connection 36 to one end of the suspension unit 35. A link 37 connects the other end of the suspension unit 35 with the bracket 34 through a pivot pin 38. The link 37 is connected to a lever arm 39 that is pivoted on a further frame tube 41. Hence, the suspension unit 16 loads both ends of the cushioning unit 35 upon suspension travel of the rear of the drive belt.

It should be readily apparent that this prior art type of construction is quite complicated in nature. Also, because of the manner in which the cushioning units 26 and 35 are positioned within the confines of the drive belt 13, the amount of suspension travel is somewhat limited. It is important to be able to obtain relatively large movements of the cushioning units 26 and 35 and of the guide rail 17 and drive belt 13 relative to the frame 11. By having large suspension travel, small bumps can be softly cushioned and yet larger more severe bumps can be cushioned over a larger stroke and with progressively increasing rates as to improve the ride and handling of the vehicle.

It is, therefore, a principal object of this invention to provide an improved drive belt suspension arrangement for a snowmobile.

It is a further object of this invention to provide a simplified compact and yet highly effective suspension system for a snowmobile drive belt.

It is a yet further object of this invention to provide an improved drive belt suspension system for a snowmobile wherein a single cushioning unit can be provided for damping both the front and rear portions of the guide rail and to obtain large suspension travels and yet have a compact assembly.

SUMMARY OF THE INVENTION

This invention is adapted to be embodied in a snowmobile that is comprised of a frame assembly, a drive belt and an engine and transmission for driving the drive belt. A suspension system is provided for suspending the drive belt from the frame assembly for suspension movement therebetween. The suspension system includes at least one guide rail engaged with a back side of the drive belt and opposite to the portion of the drive belt which engages the terrain over which the snowmobile is traveling. A first suspension unit interconnects a forward portion of the guide rail with the frame assembly for controlling the relative movement therebetween. A second suspension unit interconnects the rear portion of the guide rail with the frame assembly for suspension movement therebetween. A cushioning unit having relatively movable end portions is provided for cushioning relative movement. First loading means interconnect the first suspension unit with the cushioning unit for effecting opposite relative movement between the ends thereof upon movement of the forward portion of the guide rail relative to the frame assembly. A second loading means connects the second suspension unit with the cushioning unit for effecting opposite relative movement between the ends of the cushioning unit upon relative movement of the rear guide rail relative to the frame assembly.

DETAILED DESCRIPTION OF THE PREFERRED EMBODIMENTS OF THE INVENTION

Figure 1:
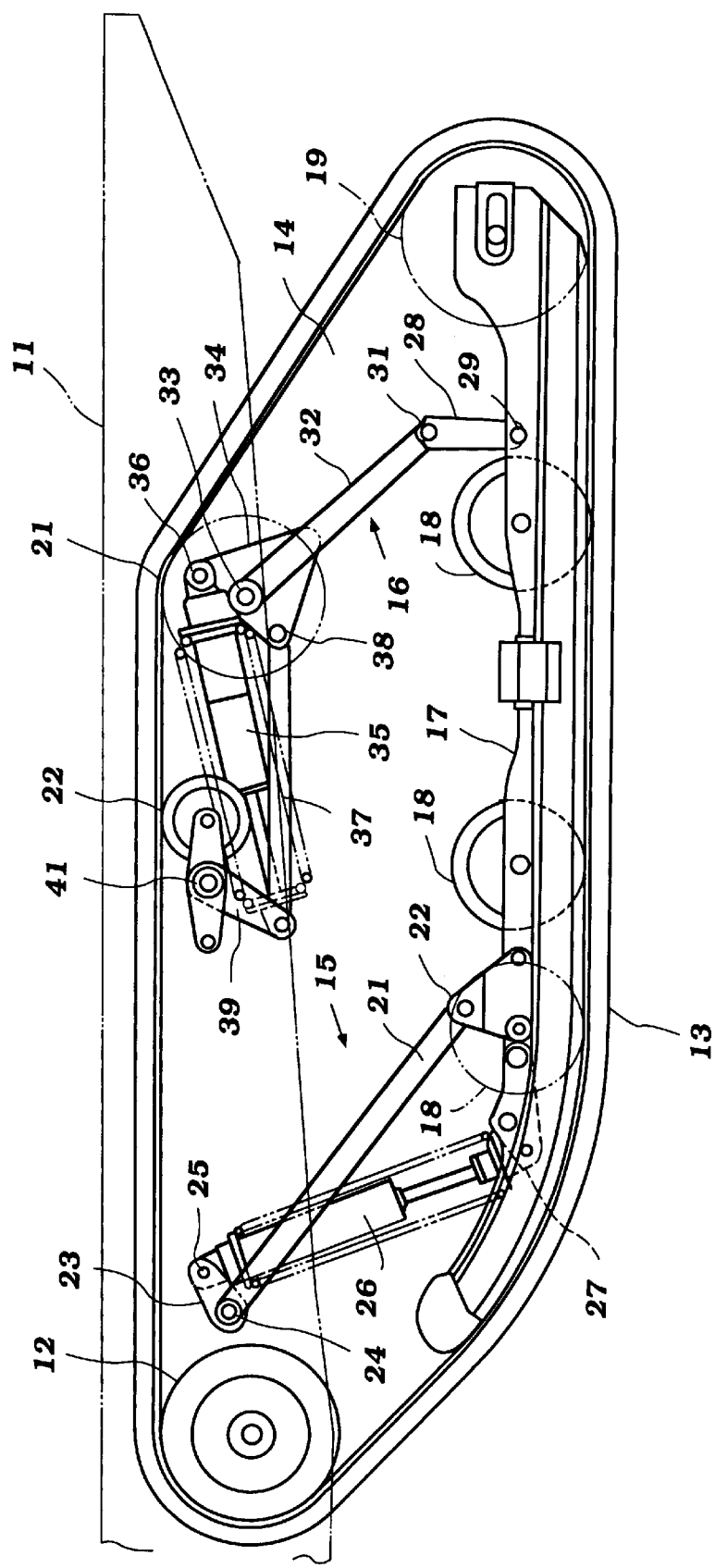
FIG. 1 is a partial side elevational view of a prior art type of snowmobile suspension system with a portion of the frame assembly shown in phantom.
Figure 2:
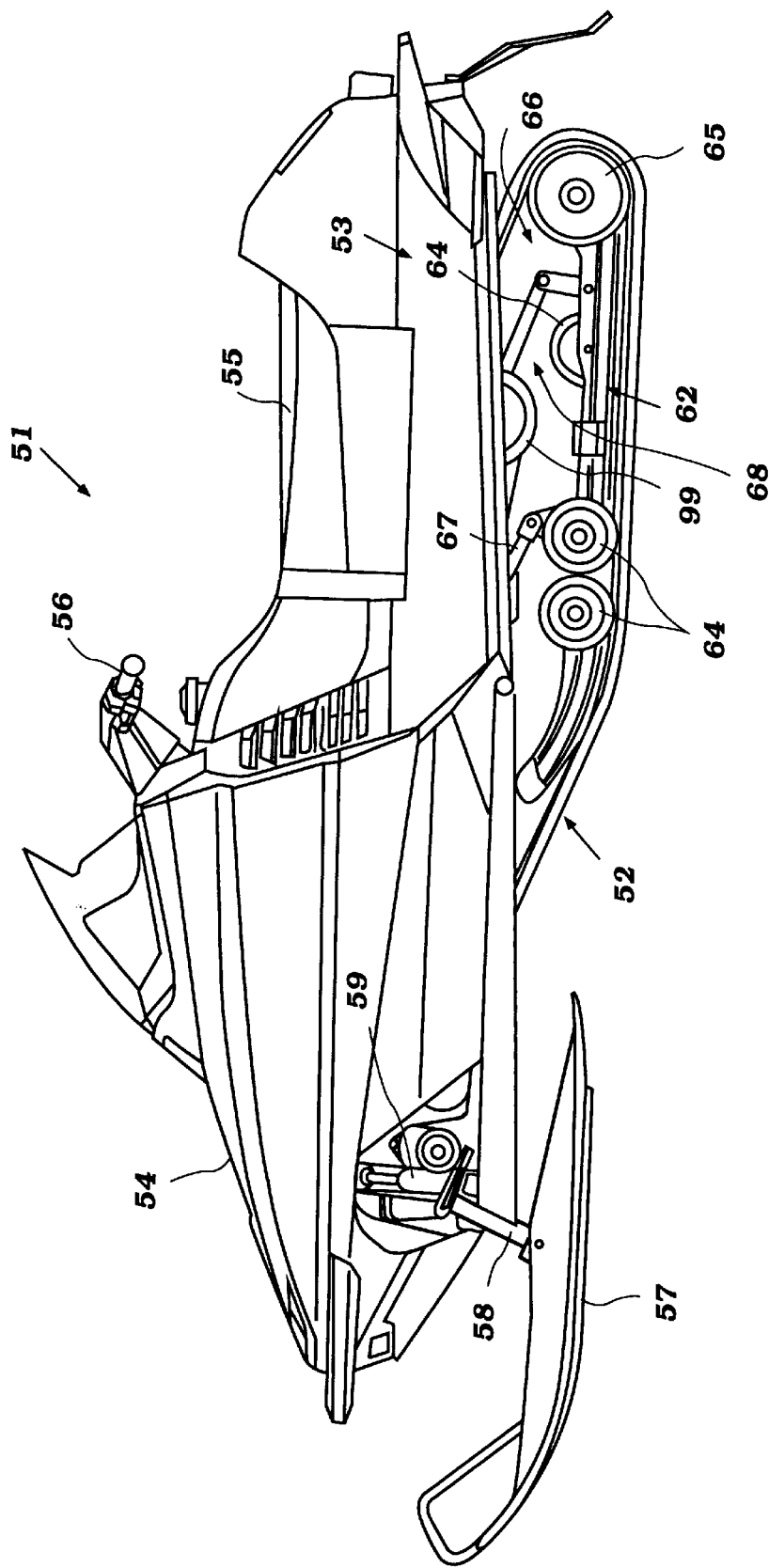
FIG. 2 is a side elevational view of a snowmobile having a drive belt suspension system constructed in accordance with a first embodiment of the invention and in a generally unladened condition.

Referring now in detail to the drawings and initially to the embodiment of FIGS. 2–5 and initially primarily to FIG. 2, a snowmobile constructed in accordance with an embodiment of the invention is identified generally by the reference numeral 51. Since the invention deals primarily with the suspension for the drive belt, indicated generally by the reference numeral 52, the overall construction of the snowmobile 51 will be described only generally. Where any components of the snowmobile 51 are not described in detail or not illustrated, reference may be had to any known prior art construction for such missing details.

The snowmobile 51 includes a frame assembly, indicated generally by the reference numeral 53, which consists primarily of a pair of side frame members that are formed from sheet metal or the like. A body 54 covers the forward portion of the snowmobile and a major portion of the rear part thereof. A seat 55 is disposed behind a control handlebar assembly 56 for operation of the snowmobile 51 by a rider seated on the seat 55.

A pair of front skis 57 are journaled by respective ski suspension units 58 that include strut-type dampers 59. This front suspension permits steering movement of the front skis 57 in a known manner. This steering movement is controlled by the handlebar assembly 56.

Contained within the interior of the front portion of the body 54 is an internal combustion engine of any known type which drive a transmission. The transmission may be of the continuously variable type and can include a centrifugal clutch for driving the drive belt 52.

Figure 3:
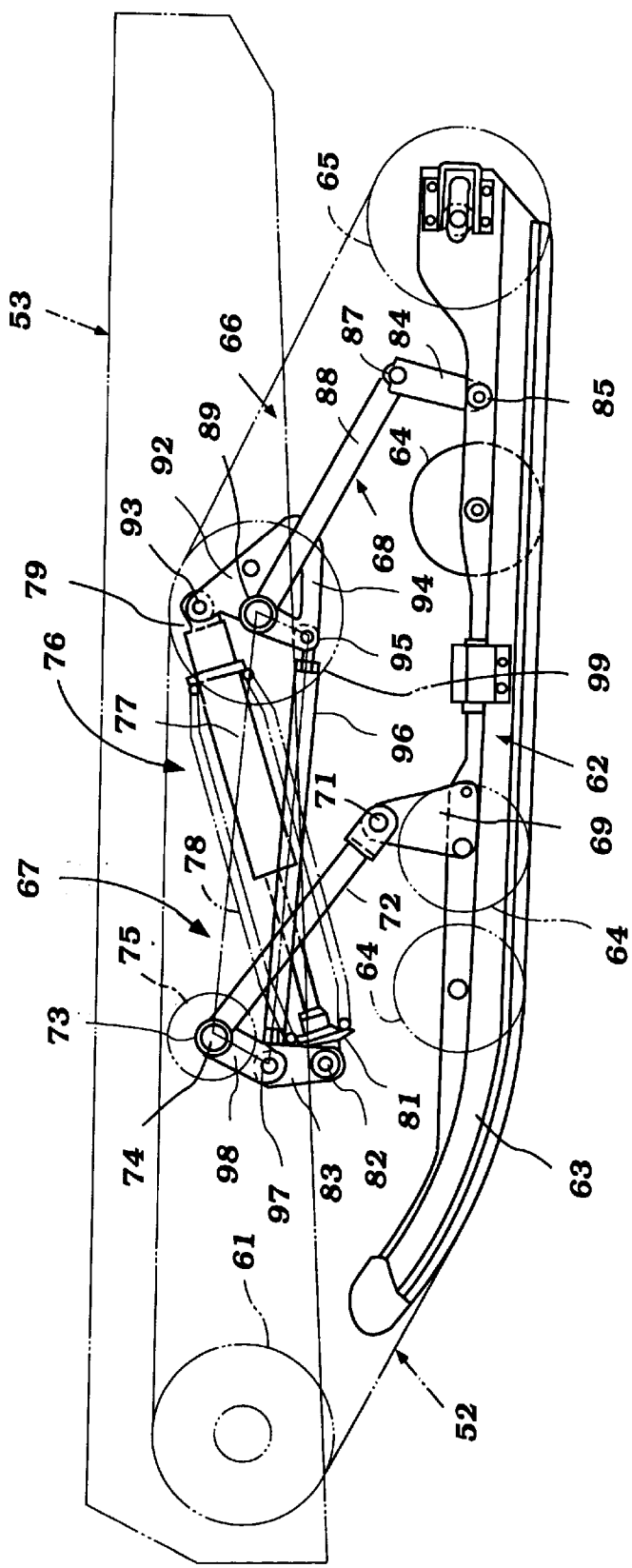
FIG. 3 is an enlarged, partial, side elevational view, in part similar to FIG. 1, showing the drive belt suspension system in a partially compressed position.
Figure 4:
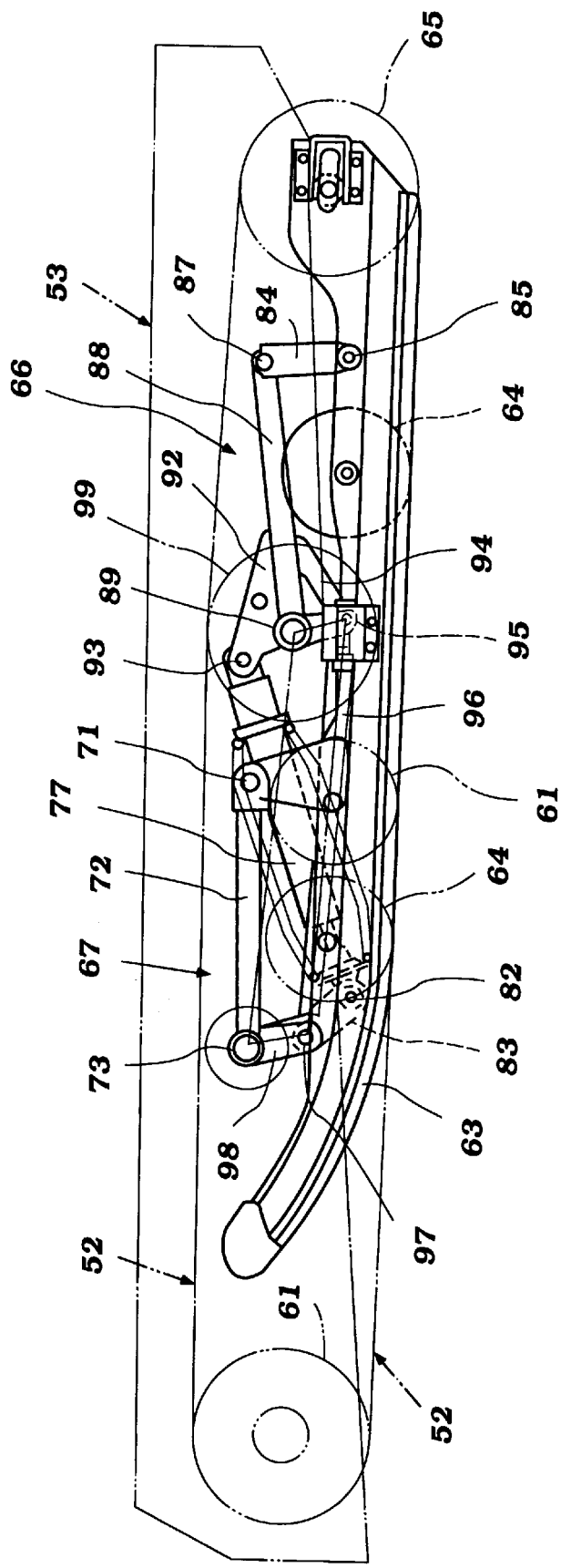
FIG. 4 is a side elevational view, in part similar to FIG. 3, and shows the drive belt at the end of its suspension travel.

The drive belt 52 and its suspension system will now be described in more detail by reference to FIGS. 3–5. As with the prior art type of construction, a driving sprocket assembly 61 is journaled upon the frame assembly 53 in a known manner and is driven through the aforenoted engine/transmission combination. The sprocket 61 is engaged with the backside of the drive belt 52 and drives it through a suitable and known type of cog mechanism.

A guide rail assembly, indicated generally by the reference numeral 62, comprised of a pair of spaced apart but interconnected guide rails 63 cooperates with and engages the backside of the drive belt 52. This guide rail assembly 62 journals a plurality of backup rollers 64 and a larger idler roller 65 mounted at the rear end of the guide rail assembly 52. The guide rail assembly 62 is supported for suspension movement relative to the frame assembly 53 by a suspension system, indicated generally by the reference numeral 66. This suspension assembly 66 includes a front suspension unit 67 and a rear suspension unit 68.

This front suspension unit 67 includes a pair of brackets 69 each of which is affixed to a respective one of the guide rails 63. A pivot pin 71 interconnects each bracket 69 to one end of a suspension link 72. The other ends of the suspension link 72 are rigidly connected to a tubular member 73 which is, in turn, journaled between the rails of the frame assembly 53 on a tubular shaft 74. Backup rollers 75 are carried at the ends of the tubular member 73 and are journaled independently on the shaft 74. These backup rollers 75 also are adapted to engage the backside of the return flight of the drive belt 52.

A single cushioning unit, indicated generally by the reference numeral 76 is mounted so as to extend in a generally longitudinal direction within the confines of the drive belt 52. This suspension unit 76 includes a hydraulic shock absorber assembly 77 and a surrounding coil compression spring 78. This suspension unit has a first end portion 79 disposed to the rear and a second end portion 81 disposed to the front. A pivot pin 82 pivotally interconnects the suspension unit end 81 with a pair of levers 83 which are, in turn, fixed to the tube 73. Hence, when the tube 73 is rotated by movement caused by the upward or downward movement of the guide rail brackets 69, the suspension unit end 81 will be moved in one direction or the other through its connection to the bracket 83.

The opposite end 79 of the cushioning unit 76 is also loaded upon this suspension travel for movement in a direction opposite to the end 81 by a system which is interrelated with the rear suspension unit 68 in a manner which will be described shortly.

The rear drive belt suspension unit 68 includes a first pair of links 84 that are pivotally connected at their lower ends to the guide rail 63 by a pivot shaft 85. These links 84 are affixed to a tubular member 86 which, in turn, is journaled on the pivot shaft 85.

The upper ends of the links 84 are connected by a pivot shaft 87 which, in turn, is connected to a further pair of links 88. The links 88 extend upwardly and forwardly and are connected to a tubular member 89. The tubular member 89 is journaled on a pivot shaft 91 that is connected between the side members of the frame assembly 53.

A pair of bracket arms 92 are affixed, as by welding, to the tubular shaft 89. These bracket arms 92 function as bell cranks and have a common pivotal connection 93 to the end 79 of the cushioning unit 76. Thus, upon suspension travel of the rear of the guide rail assembly 62, the cushioning unit end 79 is moved in a respective direction. Like the front suspension unit 67, the rear suspension unit 66 also loads the opposite end of the cushioning unit 76 upon this movement and for movement in an opposite direction.

This connecting structure also functions to load the suspension unit end 79 upon suspension travel of the front suspension unit 67. To this end, the bell crank assembly 92 also includes a further arm portion 94 which is welded or otherwise fixed at spaced locations to the tubular member 89. This bell crank portion 94 has a pivotal connection at 95 to a pair of tie bar links 96. The opposite ends of the tie bar links 96 are connected by pivotal connections 97 to a further pair of arms 98 which are welded to the tubular member 73. Hence, the link or tie bars 96 interconnect the tubular members 89 and 73 with each other. As may be seen in FIGS. 3 and 4, the axes of the tubular members 73 and 89 and the link tie bars 96 generally form a parallelogram linkage system.

Finally, a further pair of guide rollers 99 are journaled on the pivot shaft 91 and engage the backside of the return flight of the drive belt 52.

The suspension units operate as follows. If the front part of the drive belt 52 engages a load, the front portion of the guide rail 62 will tend to move upwardly toward the position shown in FIG. 4. The bracket 69 will transmit this motion through the link 72 to rotate the tubular member 73 in a counterclockwise direction. This movement is then transferred through the lever arms 83 to move the cushioning unit end 81 in a generally rearward direction.

At the same time, the counterclockwise rotation of the tubular member 73 will cause the levers 98 to exert a force on the tie bars 96 and move them rearwardly. This will cause the brackets 94 to be forced rearwardly to pivot the tubular member 89 in a counterclockwise direction. This will effect a loading on the pivot pin 93 that causes the cushioning unit end 79 to move to the left and thus further compress the cushioning unit 76. Hence, the amount of movement of the guide rail is amplified in the amount of compression of the cushioning unit 76.

If the rear portion of the drive belt 52 engages an obstacle, the rear portion of the guide rail 62 will also tend to move upwardly. This upward movement is transmitted through the links 84 to the links 88 to cause the tubular member 89 to be rotated again in a counterclockwise direction. This movement is transmitted through the brackets 92 to the end 79 of the cushioning unit 76 to cause it to move forwardly.

At the same time, the counterclockwise rotation will cause the brackets 94 to pull the tie bars 96 rearwardly. This will cause the brackets 98 to rotate in a counterclockwise direction and move the tubular member 73 also in this direction. This rotation is transmitted through the bracket 83 to the cushioning unit end 81 to cause it to move in an opposite direction to the end 79 and amplify the movement of the cushioning unit 76.

Obviously, if the ends of guide rails 62 are moved by a load upwardly together, the same cushioning effects aforenoted will be achieved. Thus, it should be clear that the suspension arrangement permits the use of a single cushioning unit and because this cushioning unit extends generally horizontally, a large amount of suspension travel can be accommodated within the confines of the drive belt 52.

Figure 5:
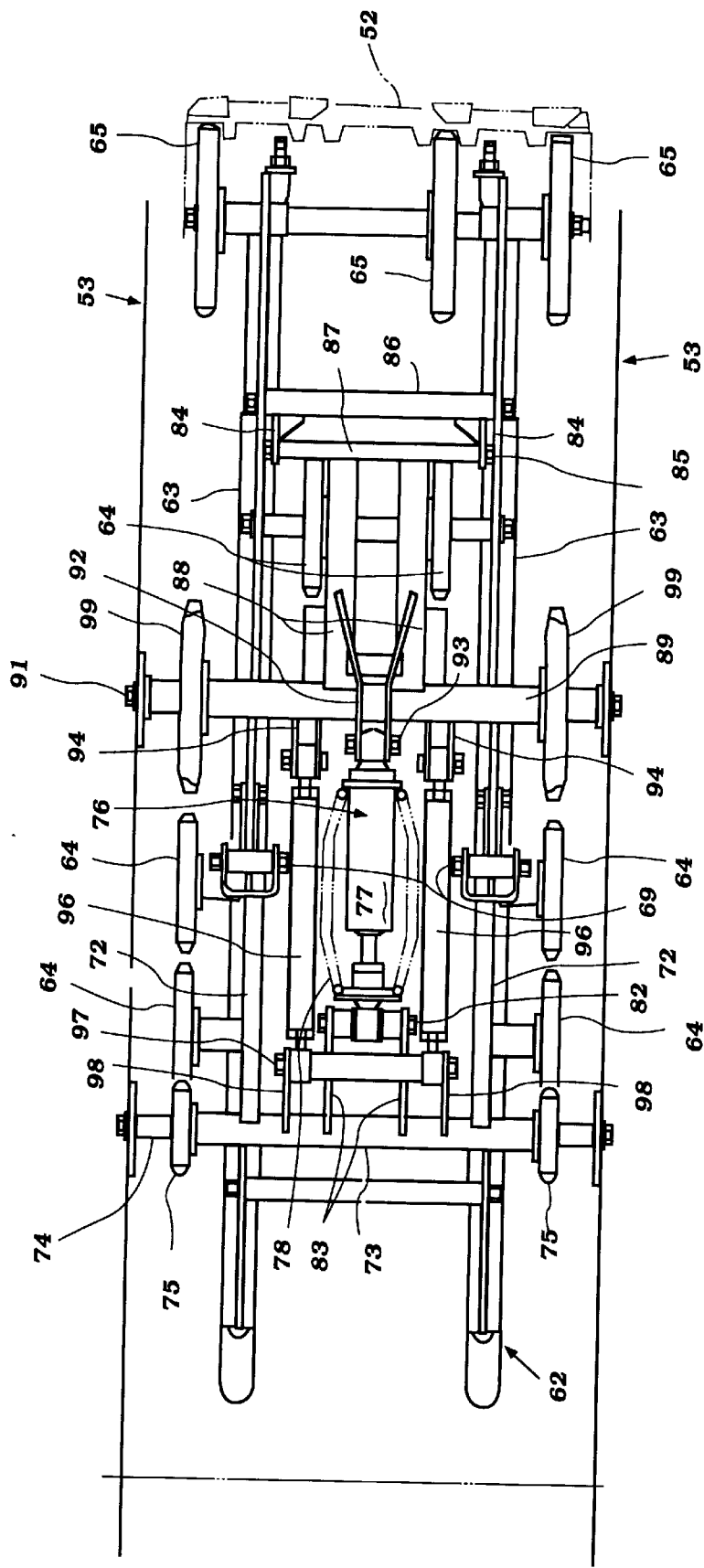
FIG. 5 is a top plan view of the drive belt suspension system of this embodiment with the drive belt removed to more clearly show the elements of this suspension system.
Figure 6:
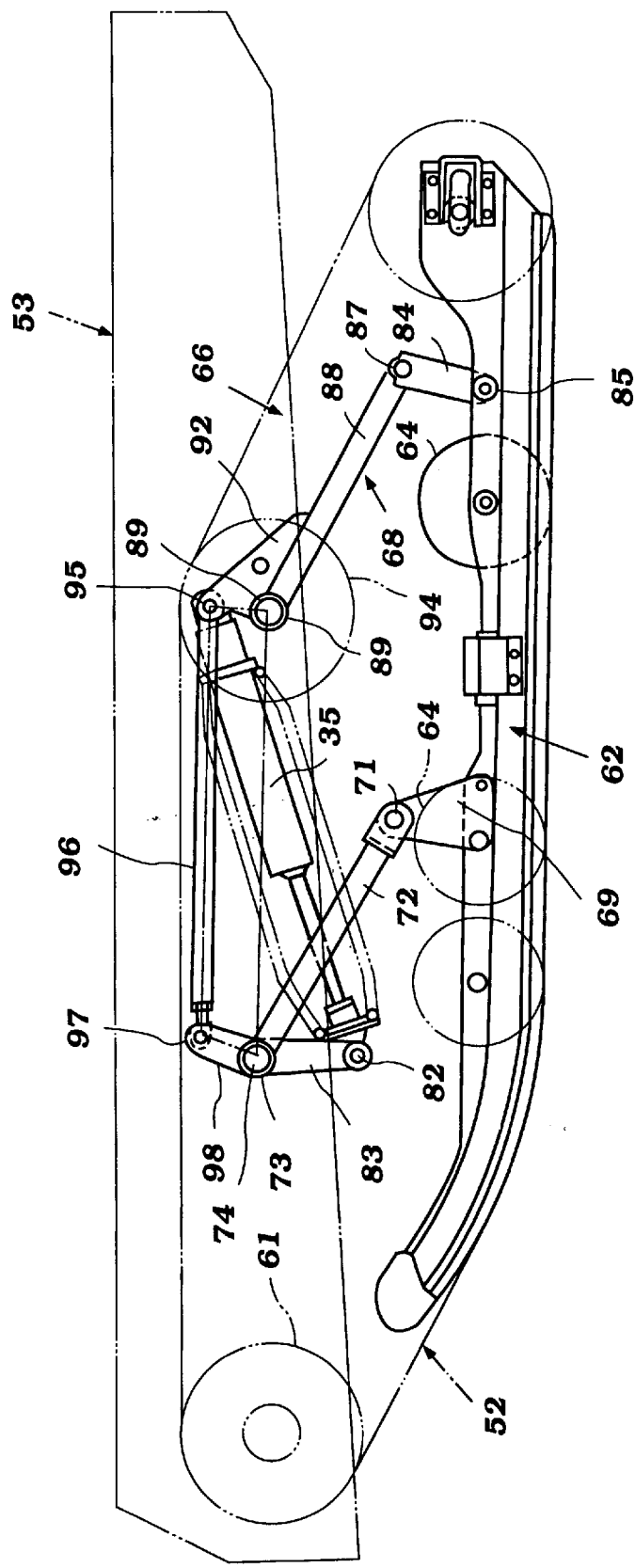
FIG. 6 is a side elevational view, in part similar to FIG. 3, and shows a second embodiment of the invention.

FIG. 6 shows another embodiment of the invention which operates in principle the same as the embodiment of FIGS. 2–5. However, some simplification of the linkage system is provided by relocation of the component. Since the system is basically the same as that previously described, components which have the same structure and/or function have been identified, for the most part, by the same reference numerals and will be described again only insofar as is necessary to understand the construction and operation of this embodiment.

In this embodiment, the location of the pivot shaft 74 is disposed so that the pivotal connection 97 to the tie bar 96 lies on one side of it and opposite to the pivotal connection 82 of the bracket assembly 83 to the tubular member 73. In other words, the levers 83 and 98 in this embodiment operate more like a bell crank than a pair of levers both on the same side of the tubular member 73. Because of this, the connection 95 of the tie bar 96 can be directly to the bracket 92 of the tubular member 89. Thus, the bracket 94 can be eliminated with this embodiment. Thus, this embodiment also provides a parallelogram like linkage system through reversal of the tie bar 96 from below the pivot axes of the pivot shafts of the tubular members 73 and 89 to above these pivotal axes.

This positioning of the tie bar 96 also permits it to function as a back up for the return flight of the drive belt 52. Thus the back up rollers 75 of the previous embodiment may be deleted.

Figure 7:
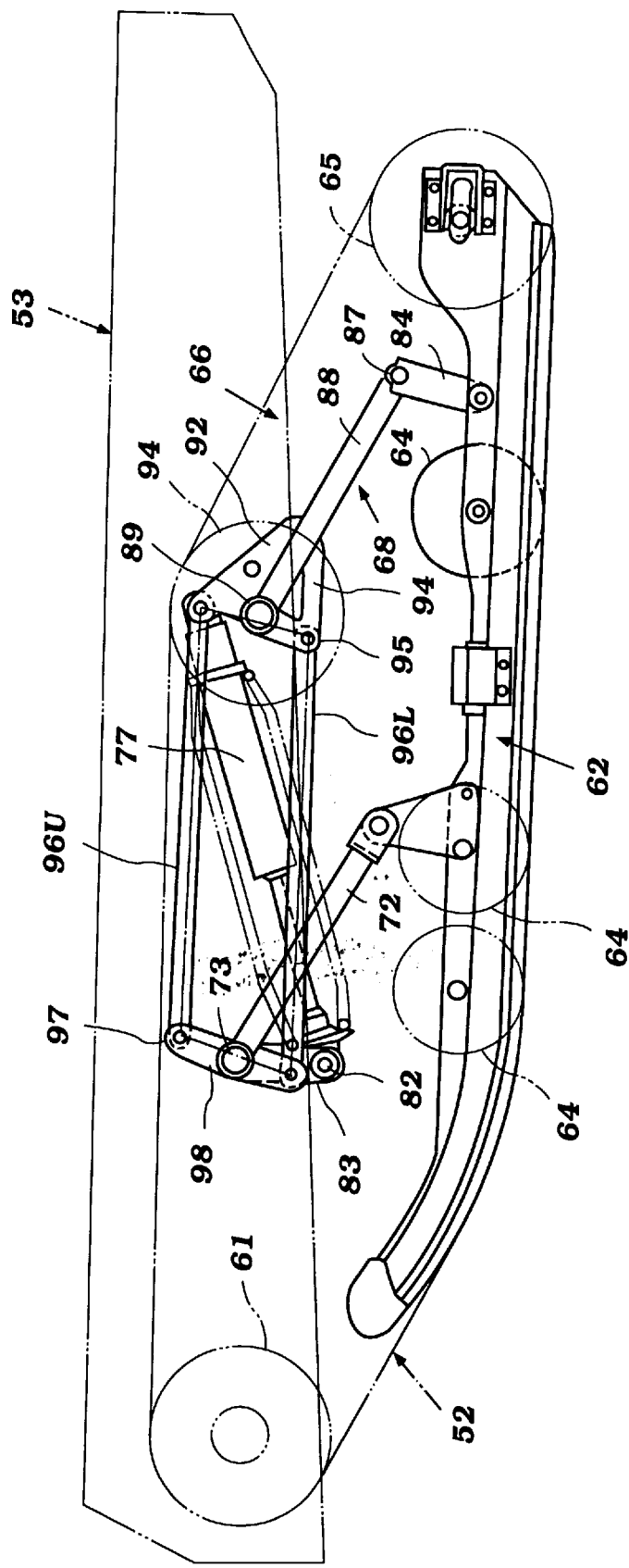
FIG. 7 is a side elevational view, in part similar to FIGS. 3 and 6 and shows a third embodiment of the invention.

FIG. 7 shows an embodiment which basically combines the structures of FIGS. 5 and 6 and thus uses an upper set of tie bars 96-U and a lower set of tie bars 96-L. Hence, this structure provides a more robust but more complicated structure than the previously described embodiments. In this embodiment, the tie bars 96-U and 96-L themselves form an actual and complete parallelogram linkage system. This embodiment also eliminates the need for the back up rollers 75.

Thus, from the foregoing description, it should be readily apparent that the described embodiments of the invention provide a very effective and compact suspension system for a snowmobile that permits large suspension travels and sufficient movement for effective loading of the single cushioning unit. Of course, the foregoing description is that of preferred embodiments of the invention and various changes and modifications may be made without departing from the spirit and scope of the invention, as defined by the appended claims.

What is claimed is:

1. A snowmobile comprised of a frame assembly, a drive belt, an engine and transmission for driving said drive belt, and a suspension system for suspending said drive belt from said frame assembly for suspension movement therebetween, said suspension system comprising at least one guide rail engaged with a backside of said drive belt and opposite the terrain engaged by said drive belt for propelling said snowmobile along said terrain, a first suspension unit for interconnecting a forward portion of said guide rail with said frame assembly for controlling relative movement therebetween, a second suspension unit for interconnecting a rearward portion of said guide rail with said frame assembly for controlling relative movement therebetween, a unitary cushioning unit having relatively movable end portions for resiliently cushioning relative movement, first loading means for effecting relative movement of said end portions of said unitary cushioning unit to each other in opposite directions upon suspension movement of the forward portion of said guide rail, and second loading means for effecting relative movement of said end portions of said unitary cushioning unit to each other in opposite directions upon suspension movement of the rear portion of said guide rail so that said unitary cushioning unit cushions both the front and rear suspension movement of said guide rail.

2. A snowmobile as set forth in claim 1, wherein the unitary cushioning unit extends so that the unitary line of action between its end portions extends generally horizontally.

3. A snowmobile as set forth in claim 2, wherein the unitary cushioning unit comprises a single tubular shock absorber and a surrounding coil compression spring.

4. A snowmobile as set forth in claim 3, wherein the cushioning unit and the suspension units are disposed within the confines of the unitary drive belt.

5. A snowmobile as set forth in claim 1, wherein the first suspension unit comprises a link.

6. A snowmobile as set forth in claim 5, wherein the first suspension unit link has a pivotal connection at one of its ends to the guide rail and a pivotal connection at the other of its ends to the frame assembly.

7. A snowmobile as set forth in claim 6, wherein the cushioning unit extends so that the line of action between its end portions extends generally horizontally.

8. A snowmobile as set forth in claim 7, wherein the cushioning unit comprises a single tubular shock absorber and a surrounding coil compression spring.

9. A snowmobile as set forth in claim 8, wherein the cushioning unit and the suspension units are disposed within the confines of the drive belt.

10. A snowmobile as set forth in claim 9, wherein the second suspension unit comprises a pair of pivotally connected links.

11. A snowmobile as set forth in claim 10, wherein one end of one of the links is pivotally connected to the guide rail and one of the ends of the other of the pivotally connected links is pivotally connected to the frame assembly.

12. A snowmobile as set forth in claim 1, wherein the second suspension unit comprises a pair of pivotally connected links.

13. A snowmobile as set forth in claim 12, wherein one end of one of the links is pivotally connected to the guide rail and one of the ends of the other of the pivotally connected links is pivotally connected to the frame assembly.

14. A snowmobile as set forth in claim 1, wherein the first and second suspension units each have respective first and second pivotal connections to the guide rail and the frame assembly.

15. A snowmobile as set forth in claim 14, wherein the pivotal connections of the links to the frame assembly effect pivotal movement of respective levers which levers are pivotally connected at one end to a corresponding end of the cushioning unit.

16. A snowmobile as set forth in claim 15, further including a tie bar pivotally connected to the pivotal connections of the first and second suspension units to the frame for forming an effective parallelogram linkage system so that each suspension unit loads both ends of the unitary cushioning unit upon relative movement of the guide rail relative to the frame assembly.

17. A snowmobile as set forth in claim 16, further including a second tie bar pivotally connected to the pivotal connections of the first and second suspension units to the frame on the side opposite the first mentioned tie bar for forming an effective parallelogram linkage system so that each suspension unit loads both ends of the unitary cushioning unit upon relative movement of the guide rail relative to the frame assembly.

* * * * *

UNITED STATES PATENT AND TRADEMARK OFFICE
CERTIFICATE OF CORRECTION

PATENT NO.   : 5,904,216
DATED        : May 18, 1999
INVENTOR(S)  : Furusawa

It is certified that error appears in the above-identified patent and that said Letters Patent is hereby corrected as shown below:

Column 6,
Lines 50 & 51, 59 & 60, 62 & 63 and 65 & 66, please change "the cushioning" to -- the unitary cushioning --.

Signed and Sealed this

Fifteenth Day of October, 2002

Attest:

Attesting Officer

JAMES E. ROGAN
Director of the United States Patent and Trademark Office